J. C. LYONS.
Attachment for Bee-Hive.

No. 217,017.                    Patented July 1, 1879.

Witnesses:
James H. Lyons.
W. W. Carter

Inventor:
Justus C. Lyons.

UNITED STATES PATENT OFFICE.

JUSTUS C. LYONS, OF FOND DU LAC, WISCONSIN.

IMPROVEMENT IN ATTACHMENTS FOR BEE-HIVES.

Specification forming part of Letters Patent No. 217,017, dated July 1, 1879; application filed October 12, 1878.

*To all whom it may concern:*

Be it known that I, JUSTUS C. LYONS, of Fond du Lac, in the county of Fond du Lac and State of Wisconsin, have invented a new and useful Attachment for Bee-Hives, which I wish to be known as a "Bee Saver and Catcher," of which the following is a specification.

The invention consists in the device hereinafter described, and more particularly pointed out in the claims. The model and drawings show a perforated box and several devices of conical or pyramidal shape, which for convenience are referred to as cones in this specification, though I do not confine myself to that particular construction.

Figure 1:
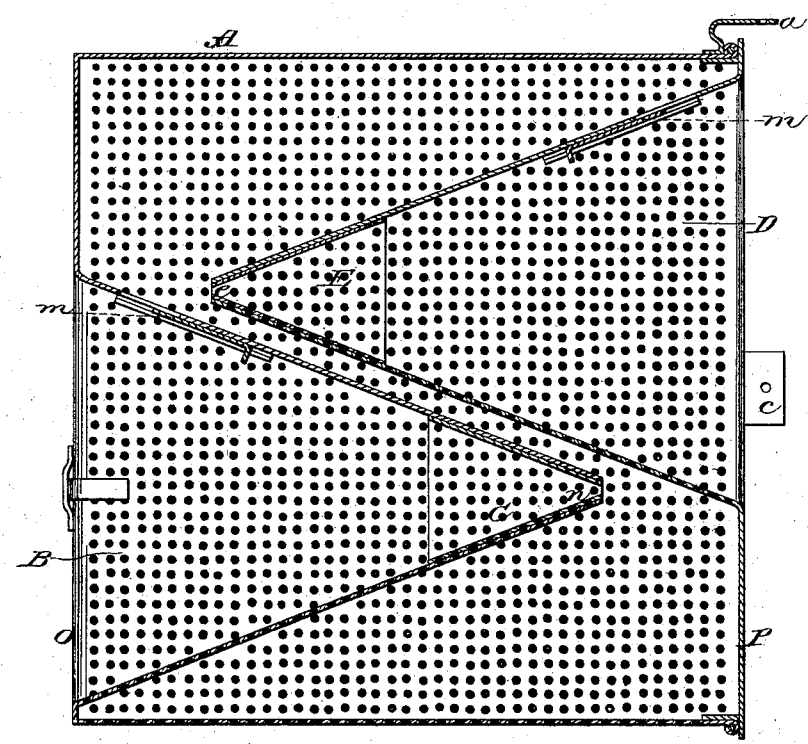
Figure 2:
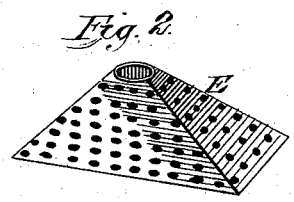

In the drawings, Figure 1 is a longitudinal vertical section of my device; Fig. 2, a perspective view of one of the smaller cones, and Fig. 3 a perspective view of the inner portion of the larger cone.

Figure 3:
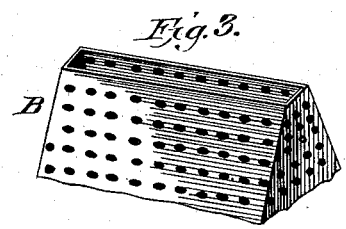

The box A P O, Fig. 1, has an opening in each end, into which are inserted the cones B and D in such a manner that the apex of each cone comes near the base of the other. These cones have each an elongated opening, as represented in Fig. 3. They are provided with two smaller cones, C and E, Fig. 1. Each contains a small hole at its apex, as represented in Fig. 2. These smaller cones are inserted into the larger cones, B and D, at their apexes n and e. The cones B and D are also provided with slide-doors m m near their bases, and should be so placed in the box with respect to each other that the elongated apex of one cone will be near the slide-door of the other.

The uses of the invention are to save bees and honey, separate drones or queen from working bees without hindering the bees from working, and to prevent bees from robbing.

The first part of the invention relates to saving bees in wintering, and to aid in the convenience for moving them. The end P of the box A P O, with cone D attached, should be removed and the open end of the box placed over the opening in the hive where the bees issue from the hive. This allows the bees to come into the box, giving them opportunity to fly and circulate, and at the same time preventing them from chilling and dying on snow, besides many other advantages that result from this arrangement.

Another part of the invention relates to the cones B and D, above described, placed in the box in the manner above directed. By regulating the slide-doors the drones or queen in attempting to pass out from the hive will be caught in the box, while the working-bees may continue their labor without molestation.

Another part relates to the combination of the small cones, C and E, with the larger cones, B and D, in the manner above described. When placed on a hive that bees are robbing they are allowed to enter; but the construction and arrangement of the cones prevent their egress, and they are either caught in the box or obliged to remain in the hive, which is the object of this part of the invention.

What I claim as my invention is—

1. The combination of the box with the cones containing slide-doors, inserted one in in each end of the box, for the purpose of separating the queen and drones from the working-bees, substantially as hereinbefore set forth.

2. The combination of the box and cones with the two smaller cones, substantially as and for the purpose hereinbefore set forth.

JUSTUS C. LYONS.

Witnesses:
 JAMES H. LYONS,
 Dr. W. C. PRIEST.